United States Patent
Chen et al.

(10) Patent No.: US 12,258,456 B2
(45) Date of Patent: *Mar. 25, 2025

(54) PREPARATION METHOD FOR SPHERICAL OR ANGULAR POWDER FILLER, SPHERICAL OR ANGULAR POWDER FILLER OBTAINED THEREBY, AND APPLICATION THEREOF

(71) Applicant: Zhejiang Third Age Material Technology Co., LTD, Zhejiang (CN)

(72) Inventors: Shuzhen Chen, Zhejiang (CN); Rui Li, Zhejiang (CN); Cheng Tang, Zhejiang (CN); Lieping Ding, Zhejiang (CN); Chen Chen, Zhejiang (CN)

(73) Assignee: Zhejiang Third Age Material Technology Co., LTD, Zhejiang (CN)

( * ) Notice: Subject to any disclaimer, the term of this patent is extended or adjusted under 35 U.S.C. 154(b) by 555 days.

This patent is subject to a terminal disclaimer.

(21) Appl. No.: 17/432,548

(22) PCT Filed: Dec. 5, 2019

(86) PCT No.: PCT/CN2019/123337
§ 371 (c)(1),
(2) Date: Aug. 20, 2021

(87) PCT Pub. No.: WO2020/168784
PCT Pub. Date: Aug. 27, 2020

(65) Prior Publication Data
US 2022/0153936 A1     May 19, 2022

(30) Foreign Application Priority Data

Feb. 22, 2019 (WO) ................ PCT/CN2019/075831
Sep. 29, 2019 (WO) ................ PCT/CN2019/109108

(51) Int. Cl.
*C08J 3/14*     (2006.01)
*C08K 3/36*     (2006.01)

(52) U.S. Cl.
CPC .................... *C08J 3/14* (2013.01); *C08K 3/36* (2013.01); *C08J 2383/04* (2013.01)

(58) Field of Classification Search
CPC ........... C08J 3/14; C08J 2383/04; C08K 3/36; C08L 83/06
See application file for complete search history.

(56) References Cited

U.S. PATENT DOCUMENTS

| | | | |
|---|---|---|---|
| 2002/0024161 A1* | 2/2002 | Konya | C03B 19/1025 264/80 |
| 2008/0268362 A1* | 10/2008 | Kudo | G03G 9/0906 430/108.1 |
| 2011/0057172 A1 | 3/2011 | Song et al. | |
| 2019/0002642 A1* | 1/2019 | Knoer | A61Q 19/00 |

FOREIGN PATENT DOCUMENTS

| | | |
|---|---|---|
| CN | 103205125 A | 7/2013 |
| CN | 104449550 A | 3/2015 |
| CN | 106189251 A | 12/2016 |
| CN | 108463509 A | 8/2018 |
| EP | 1295905 A1 | 3/2003 |

\* cited by examiner

*Primary Examiner* — Doris L Lee
(74) *Attorney, Agent, or Firm* — Olive Law Group, PLLC

(57) ABSTRACT

A preparation method for a spherical or angular powder filler, comprising: providing spherical or angular siloxane comprising a T unit, wherein the T unit is $R_1SiO_{3-}$, and $R_1$ is a hydrogen atom or an organic group which can be independently selected from carbon atoms 1-18; and performing heat treatment on the spherical or angular siloxane under an inert gas atmosphere or atmospheric atmosphere, the heat treatment temperature being between 250 degrees and 650 degrees, so that silicon hydroxyl groups in the spherical or angular siloxane are condensed to obtain the spherical or angular powder filler. In the unit T of the spherical or angular powder filler, the content of the unit without containing a hydroxyl group in the total unit is greater than or equal to 95%, and the content of the unit containing one hydroxyl group in the total unit is less than or equal to 5%. Also disclosed are the spherical or angular powder filler obtained by the preparation method, and application thereof. The spherical or angular powder filler has low permittivity, low water absorption and low radioactivity.

8 Claims, No Drawings

PREPARATION METHOD FOR SPHERICAL OR ANGULAR POWDER FILLER, SPHERICAL OR ANGULAR POWDER FILLER OBTAINED THEREBY, AND APPLICATION THEREOF

This application is a 371 of international PCT/CN2019/123337, filed on Dec. 5, 2019, which claims priority to PCT/CN2019/075831, filed on Feb. 22, 2019, and PCT/CN2019/109108, filed on Sep. 29, 2019, the contents of each of which are hereby incorporated by reference.

BACKGROUND OF THE INVENTION

1. Field of the Invention

The invention relates to the packaging of semiconductors, and more specifically to a preparation method for a spherical or angular powder filler, the spherical or angular powder filler obtained thereby, and application thereof.

2. Related Art

During the packaging of the semiconductor back-end process, packaging materials such as molding compounds, patch glues, underfill materials and chip carriers are required. In addition, when assembling passive components, semiconductor components, electro-acoustic devices, display devices, optical devices and radio frequency devices into equipments, circuit boards such as high-density interconnects (HDI), high-frequency high-speed boards, and motherboards are also required. These packaging materials and circuit boards are mainly composed of fillers and organic polymers such as epoxy resin, aromatic polyether and fluororesin. The filler is mainly spherical or angular silica, whose function is to reduce the coefficient of thermal expansion of the organic polymers. The spherical or angular silica is tightly packed and graded to provide the existing filler. The chemical structure of silica is the Q unit of Si, namely $SiO_4$.

On the one hand, with the advancement of technology, the signal frequency used by semiconductors is getting higher and higher, and the high-speed low-loss signal transmission requires fillers with low permittivity. On the other hand, the permittivity (also known as inductivity) of a material basically depends on the chemical composition and structure of the material. Silica has its inherent permittivity. Therefore, the existing silica fillers cannot meet the requirement of lower permittivity.

Similarly, with the advancement of technology, the integration of semiconductors is getting higher and higher, and the smaller and smaller size requires fillers with high purity, without conductive impurities and without coarse oversize particles. However, it is difficult to avoid the coarse oversize particles and conductive impurities in the existing spherical or angular silica. Moreover, once coarse oversize particles and conductive impurities have been mixed, they cannot be removed by dry methods. Therefore, the existing filler cannot meet the requirement without conductive impurities and without coarse oversize particles.

For semiconductor memory, low radioactivity is required for the filler. However, the purity of the existing silica largely depends on the purity of the natural mineral itself. Therefore, the existing silica filler cannot fully meet the requirement of low radioactivity.

SUMMARY OF THE INVENTION

The present invention aims to provide a preparation method for a spherical or angular powder filler, the spherical or angular powder filler obtained thereby, and application thereof. The provided filler has low permittivity, without conductive impurities, without coarse oversize particles and low radioactivity.

The present invention provides a preparation method for a spherical or angular powder filler, comprising the steps of S1, providing spherical or angular siloxane comprising a T unit, wherein the T unit=$RiSiOS_{3-}$, and $R_1$ is a hydrogen atom or an organic group which can be independently selected from carbon atoms 1-18; and S2, performing heat treatment on the spherical or angular siloxane under an inert gas atmosphere or atmospheric atmosphere, the heat treatment temperature being between 250 degrees and 650 degrees, so that silicon hydroxyl groups in the spherical or angular siloxane are condensed to obtain the spherical or angular powder filler, wherein in the unit T of the spherical or angular powder filler, the content of the unit without containing a hydroxyl group in the total unit is greater than or equal to 95%, and the content of the unit containing one hydroxyl group in the total unit is less than or equal to 5%.

Different from the existing silica fillers containing only Q unit, the spherical or angular powder filler of the present invention comprises a T unit. The introduction of organic group $R_1$ can greatly reduce the permittivity. The powder is heat-treated under an inert gas atmosphere or atmospheric atmosphere. Specifically, in order to avoid oxidation of the organic group, the heat treatment temperature under the atmospheric atmosphere is preferably lower than 300 degrees, and the heating time is preferably longer than 20 hours. The heating temperature under the inert gas atmosphere such as nitrogen atmosphere can be as high as 650 degrees, and the heating time can be shorter when the temperature is high. In the present invention, the heat treatment temperature is specifically limited to 250 degrees or more to promote the condensation reaction of silicon hydroxyl groups. The higher the temperature, the faster and more sufficient the condensation is. But the heat treatment temperature of the present invention is specifically limited to 650 degrees or less to avoid thermal decomposition of carbosilane itself. The powder filler obtained after heat treatment is characterized by $^{29}Si$ NMR: the peak in the range of −30~−80 ppm corresponding to the T unit, and the area in this range is the total area S; the peak in the range of −42~−52 ppm (excluding −52 ppm) corresponding to the T unit containing two hydroxyl groups, namely $T_1$, the area in this range is $S_1$; the peak in the range of −52~−62 ppm (excluding −62 ppm) corresponding to the T unit containing one hydroxyl group, namely $T_2$, the area in this range is $S_2$; the peak in the range of −62~−75 ppm corresponding to the T unit without containing a hydroxyl group, namely $T_3$, and the area in this range is $S_3$. The spherical or angular powder filler of the present invention has $S_3/S \geq 95\%$, $S_2/S \leq 5\%$, and S1 is substantially equal to zero.

Preferably, the spherical or angular siloxane of S1 further comprises a Q unit, D unit and/or M unit, wherein the Q unit=$SiO_{4-}$, D unit=$R_2R_3SiO_{2-}$, M unit=$R_4R_5R_6SiO_{2-}$, each of $R_2$, $R_3$, $R_4$, $R_5$, and $R_6$ is a hydrogen atom or a hydrocarbyl which can be independently selected from carbon atoms 1-18. It should be understood that the introduction of the Q unit can reduce the thermal expansion coefficient, but will increase the permittivity and the permittivity loss, so the introduction amount should be adjusted as needed. In addition, the introduction of the D or M unit can reduce the permittivity and the permittivity loss, but will increase the thermal expansion coefficient, so the introduction amount should also be adjusted as needed. Preferably, the total content of the Q unit, D unit, and/or M unit in the spherical or angular siloxane is ≤20 wt %.

Preferably, the spherical or angular siloxane of S1 further comprises silica particles. It should be understood that the introduction of silica particles (also known as fine silica powder) can reduce the thermal expansion coefficient, but will increase the permittivity and the permittivity loss, so the introduction amount should be adjusted as needed. Preferably, the total content of silica particles in the spherical or angular siloxane is ≤70 wt %.

Preferably, in S2, the heat treatment is realized by electric heating or microwave heating, wherein the Si—OHs of the spherical or angular siloxane are condensed to produce the SiOSi structure. The equation of the condensation reaction is as follows:

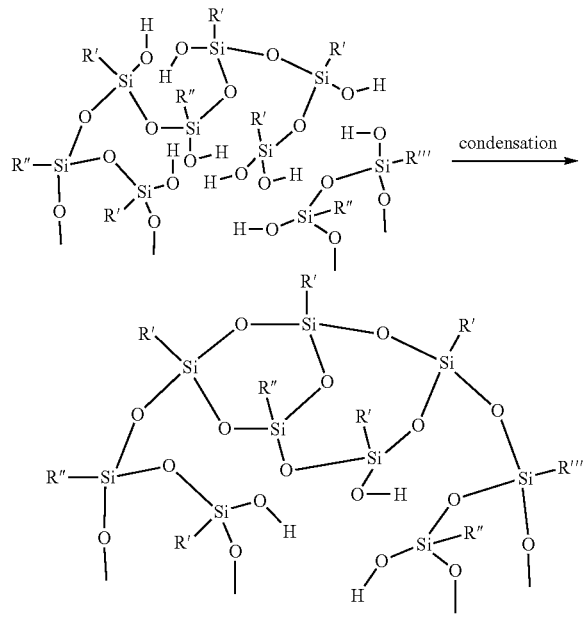

Wherein each of R', R", R'" is a hydrogen atom or an organic group $R_1$ (also known as hydrocarbyl) which can be independently selected from carbon atoms 1-18.

Preferably, the heat treatment temperature in step S2 is between 250-650 degrees. It should be understood that when the temperature is higher, the required time is shorter, and when the temperature is lower, the required time is longer. In preferred embodiments, the heat treatment time is between 1-72 hours.

Preferably, the preparation method further comprises treating the spherical or angular powder filler on surface by a treatment agent to promote the affinity between the filler and the resin.

Preferably, the treatment agent includes a silane coupling agent, which is $(R_7)_a(R_8)_bSi(M)_{4-a-b}$, wherein each of $R_7$, $R_8$ is a hydrogen atom, a hydrocarbyl which can be independently selected from carbon atoms 1-18, or a hydrocarbyl which can be independently selected from carbon atoms 1-18 replaced by functional groups, wherein the functional group is at least one group selected from following organic functional groups: vinyl, allyl, styryl, epoxygroup, aliphatic amino, aromatic amino, methacryloxypropyl, acryloxypropyl, ureidopropyl, chloropropyl, mercaptopropyl, polysulfide group, isocyanate propyl, M is an alkoxy group comprising 1-18 carbon atoms or a halogen atom, a=0, 1, 2 or 3, b=0, 1, 2 or 3, and a+b=1, 2 or 3.

Preferably, the silane coupling agent is a silane coupling agent with free radical polymerization reaction, such as vinyl silane coupling agent; a silane coupling agent reacting with epoxy resin, such as epoxy silane coupling agent or amino silane coupling agent; a hydrocarbyl silane coupling agent with high affinity to hydrophobic resins, such as dimethyldimethoxysilane, diphenyldimethoxysilane, phenylsilane coupling agent, or long-chain alkyl silane coupling agent. More preferably, the silane coupling agent is at least one coupling agent selected from following groups: dimethyldimethoxysilane, methyltrimethoxysilane, and vinyltrimethoxysilane.

Preferably, the treatment agent includes disilazane, which is $(R_9R_{10}R_{11})SiNHSi(R_{12}R_{13}R_{14})$, wherein each of $R_9$, $R_{10}$, $R_{11}$, $R_{12}$, $R_{13}$, $R_{14}$ is a hydrogen atom or a hydrocarbyl which can be independently selected from carbon atoms 1-18. More preferably, the disilazane is hexamethyldisilazane.

Preferably, the preparation method comprises removing coarse oversize particles above 75 microns in the spherical or angular powder filler by dry or wet sieving or inertial classification. Preferably, coarse oversize particles above 55 microns in the spherical or angular powder filler are removed. Preferably, coarse oversize particles above 45 microns in the spherical or angular powder filler are removed. Preferably, coarse oversize particles above 20 microns in the spherical or angular powder filler are removed. Preferably, coarse oversize particles above 10 microns in the spherical or angular powder filler are removed. Preferably, coarse oversize particles above 5 microns in the spherical or angular powder filler are removed. Preferably, coarse oversize particles above 3 microns in the spherical or angular powder filler are removed. Preferably, coarse oversize particles above 1 micron in the spherical or angular powder filler are removed.

The present invention also provides a spherical or angular powder filler obtained by above preparation method, wherein the spherical or angular powder filler has a particle size of 0.1-50 microns. Preferably, the particle size is 0.5-30 microns. In addition, the 200-degree volatile moisture content of the spherical or angular powder filler is ≤0.1%. Specifically, the water content of the powder of the present invention can be characterized by a moisture weight loss after heating at 200 degrees for 2 hours. It is well known that the water absorption of the filler is related to the permittivity loss. The greater the water absorption, the greater the permittivity loss. The spherical or angular powder filler of the present invention contains less polar hydroxyl groups, has low water absorption, and has a moisture weight loss ≤0.1% after heating at 200 degrees for 2 hours, suitable for applications such as semiconductor packaging or circuit boards with requirement of low permittivity loss.

The measurement results show that the permittivity of the spherical or angular powder filler of the present invention at 500 MHz is only 2.5-2.9, which is less than 3, while the permittivity of the existing silica filler of Q unit is about 3.8-4.5. Therefore, the spherical or angular powder filler of the present invention has a greatly reduced permittivity, and can meet the material requirement of high-frequency signal in the 5G era.

The present invention also provides an application of the above-mentioned spherical or angular powder filler, wherein the spherical or angular powder filler of different particle sizes is tightly packed and graded in resin to form a composite material. Preferably, the composite material is suitable for semiconductor packaging materials, circuit boards and intermediate semi-finished products thereof. Preferably, the packaging material is molding compound, patch glue, underfill material, or chip carrier. The molding compound is DIP package molding compound, SMT package molding compound, MUF, FO-WLP, FCBGA molding compound. Preferably, the circuit board is an HDI, a high-frequency high-speed board, or a motherboard.

It is known that the permittivity of the composite material can be approximately calculated by the following formula 1:

$$\log \varepsilon = V_1 \times \log \varepsilon_1 + V_2 \times \log \varepsilon_2 \quad \text{Formula 1:}$$

ε: the permittivity of the composite material
$V_1$: the volume fraction of the resin
$\varepsilon_1$: the permittivity of the resin
$V_2$: the volume fraction of the filler
$\varepsilon_2$: the permittivity of the filler.

Therefore, by adjusting the volume fraction of the resin and the spherical or angular powder filler, the permittivity of the composite material can be designed as required to form the packaging material, the circuit board and the intermediate semi-finished product thereof.

In short, the spherical or angular powder filler obtained by the preparation method of the present invention has low permittivity. Moreover, since the raw materials of the preparation method are all organic without involving the conventionally used angular crushed quartz, etc., and the product can be refined by industrial methods such as distillation. The resulting spherical or angular powder filler does not contain radioactive elements such as uranium and thorium, meeting the requirement of no conductive impurity no coarse oversize particle and low radioactivity. In addition, the synthesis parameters of the preparation method of the present invention can be appropriately adjusted to produce the spherical or angular powder filler with a particle size of 0.1-50 microns.

DESCRIPTION OF THE ENABLING EMBODIMENT

The preferred embodiments of the present invention are given below and described in detail.

The detection methods involved in the following embodiments include: The average particle size was measured by a laser particle size distribution instrument HORIBA LA-700, and the solvent was isopropanol.

The content of uranium and thorium was measured by Agilent 7700X ICP-MS. The sample was prepared by total dissolution in hydrofluoric acid after burning at 800 degrees.

The weight loss after heating at 200 degrees for 2 hours was weighed by an analytical balance, and the heated sample was cooled in a dry air container and then weighed. The heated sample absorbed water to gain weight when placed in the atmosphere, indicating that the weight loss after heating was the water absorbed by the siloxane. The sample before the test was placed in the atmosphere for more than 1 hour to allow the sample to absorb water in the atmosphere to reach a saturated state. The atmosphere mentioned here refers to the natural atmosphere in the subtropical area.

The content of the Q, T, D, or M unit was measured by solid $^{28}$Si-NMR nuclear magnetic resonance spectrum of JEOL ECS-400 Nuclear magnetic resonance instrument, wherein the Q unit content was calculated from the peak integrated area between −80 ppm and −120 ppm, the T unit content was calculated from the peak integrated area between −30 ppm and −80 ppm, the D unit content was calculated from the peak integrated area between −10 ppm and −30 ppm; and the M unit content was calculated from the peak integrated area between +20 ppm and −10 ppm; referring to *Separation and Purification Technology* Volume 25, Issues 1-3, October 2001, Pages 391-397, 29Si NMR and Si2p XPS correlation in polysiloxane membranes prepared by plasma enhanced chemical vapor deposition. The percentage of $T_1$, $T_2$, $T_3$ content is based on: the area in the range of −42~−52 ppm (excluding −52 ppm) is attributed to $T_1$, the area in the range of −52~−62 ppm (excluding −62 ppm) is attributed to $T_2$, the area in the range of −62~−75 ppm is attributed to $T_3$, and the integrated peak area in the range of −30 to −80 ppm is calculated as the denominator.

The permittivity was measured by KEYCOM permittivity or permittivity loss measuring device Model No.DPS18 in perturbation method and sample hole block-shaped cavity resonance method.

In this text, temperature degree refers to "degrees Celsius", that is, ° C.

Referring to methods of "Spherical Silicone Resin Micropowder", Huang Wenrun, Organic Silicone Materials, 2007, 21(5)294-299 and PCT/CN2018/124685, the spherical siloxane of different compositions in Examples and Comparative Examples was prepared for subsequent heat treatment.

Methyltrichlorosilane or methyltrimethoxysilane was added into water to provide a white precipitate. After being washed with deionized water, the precipitate was ground by a sand mill to a fine powder of 2 microns in Examples and Comparative Examples for subsequent heat treatment.

In addition, methyltrichlorosilane or methyltrimethoxysilane was mixed with silica, and the mixture was added into water to provide a white precipitate. After being washed with deionized water, the precipitate was ground by a sand mill to a fine powder of 2 microns in Examples and Comparative Examples for subsequent heat treatment.

Embodiment 1

The spherical siloxane of 100% T unit ($R_1$ is methyl) with an average particle size of 2 microns was heat-treated at different temperatures in an air or nitrogen atmosphere. The treated powder was mixed with 1% vinyltrimethoxysilane, the mixture was heated at 130° C. for 3 hours, and the powder was separated by cyclone to remove coarse oversize particles above 10 microns to obtain samples of Examples and Comparative Examples. The analysis results of the samples were listed in Table 1.

TABLE 1

| | Composition of Spherical Powder Filler | | Average Particle Size μm | Heat Treatment Temperature °C | Heat Treatment Time h | Atmosphere | 200-degree volatile moisture content % | Permittivity 500 MHz |
|---|---|---|---|---|---|---|---|---|
| | $T_3$ unit content % | $T_2$ unit content % | | | | | | |
| Example 1 | 95 | 5 | 2.0 | 250 | 72 | air | 0.09 | 2.8 |
| Example 2 | 97 | 3 | 2.0 | 450 | 20 | nitrogen | 0.05 | 2.6 |
| Example 3 | 99.5 | 0.5 | 2.0 | 650 | 6 | nitrogen | 0.04 | 2.6 |
| Comparative Example 1 | 87 | 13 | 2.0 | 120 | 72 | air | 1.2 | 3.2 |
| Comparative Example 2 | 94 | 6 | 2.0 | 200 | 20 | air | 0.1 | 2.9 |
| Comparative Example 3 | 0 | 0 | 2.0 | 650 | 72 | air | 0.05 | 3.9 |

Obviously, for each of the samples obtained according to Examples 1-3, the permittivity was less than 3 and the 200-degree volatile moisture content was less than 0.1%, meeting the requirement of low permittivity (less signal delay) of the filler in the 5G era. The water absorption and permittivity were too high of each of the samples of high $T_2$ content obtained according to Comparative Examples 1-2, and the permittivity was too high since the T unit was all oxidized to Q unit (that is silicon dioxide) according to Comparative Example 3, which do not belong to the scope of the present invention.

Embodiment 2

The spherical siloxane of 97% T unit ($R_1$ is methyl) and 3% Q unit with an average particle size of 2 microns was heat-treated in a nitrogen atmosphere. The treated powder was not treated with any treatment agent for surface treatment but was directly separated by cyclone to remove coarse oversize particles above 10 microns to obtain the sample of Example 4. The analysis

TABLE 2

| | Composition of Spherical Powder Filler | | Average Particle Size μm | Heat Treatment Temperature °C | Heat Treatment Time h | Atmosphere | 200-degree volatile moisture content % | Permittivity 500 MHz |
|---|---|---|---|---|---|---|---|---|
| | $T_3$ unit content % | $T_2$ unit content % | | | | | | |
| Example 4 | 99.6 | 0.4 | 2.0 | 550 | 20 | nitrogen | 0.02 | 2.8 |

Obviously, for the sample obtained according to Example 4, the permittivity was less than 3 and the 200-degree volatile moisture content was less than 0.1%, meeting the requirement of low permittivity (less signal delay) of the filler in the 5G era.

Embodiment 3

The spherical siloxane of 97% T unit ($R_1$ is methyl) and 3% D unit (each of $R_2$, $R_3$ is methyl) with an average particle size of 2 microns was heat-treated in an air or nitrogen atmosphere. The treated powder was treated with 2% hexamethyldisilazane, the mixture was heated at 130° C. for 3 hours, and the powder was separated by cyclone to remove coarse oversize particles above 10 microns to obtain the sample of Example 5. The analysis results of the sample were listed in Table 3.

TABLE 3

| | Composition of Spherical Powder Filler | | Average Particle Size μm | Heat Treatment Temperature °C | Heat Treatment Time h | Atmosphere | 200-degree volatile moisture content % | Permittivity 500 MHz |
|---|---|---|---|---|---|---|---|---|
| | T unit wt % | D unit wt % | | | | | | |
| Example 5 | 99.3 | 0.7 | 2.0 | 550 | 20 | nitrogen | 0.06 | 2.5 |

Obviously, for the sample obtained according to Example 5, the permittivity was less than 3 and the 200-degree volatile moisture content was less than 0.1%, meeting the requirement of low permittivity (less signal delay) of the filler in the 5G era.

Embodiment 4

Methyltrimethoxysilane was mixed with silica, and the mixture was added into water to provide a white precipitate. After being washed with deionized water, the precipitate was ground by a sand mill to a fine powder of 2 microns. The angular siloxane of 70% T unit ($R_1$ is methyl) and 30% fine silica powder (fumed white carbon) with an average particle size of 2 microns was heat-treated at different temperatures in an air or nitrogen atmosphere. The treated powder was mixed and treated with 5% dimethyldimethoxysilane, and then heated at 130° C. for 3 hours. The powder was separated by cyclone to remove coarse oversize particles above 10 microns to obtain the sample of Example 6. The analysis results of the sample were listed in Table 4.

TABLE 4

| | Composition of Spherical Powder Filler | | Average Particle Size μm | Heat Treatment Temperature ° C. | Heat Treatment Time h | Atmosphere | 200-degree volatile moisture content % | Permittivity 500 MHz |
|---|---|---|---|---|---|---|---|---|
| | $T_3$ content % | $T_2$ content % | | | | | | |
| Example 6 | 99 | 1 | 2.0 | 550 | 20 | nitrogen | 0.05 | 2.9 |

Obviously, for the sample obtained according to Example 6, the permittivity was less than 3 and the 200-degree volatile moisture content was less than 0.1%, meeting the requirement of low permittivity (less signal delay) of the filler in the 5G era.

Embodiment 5

The spherical siloxane of 100% T unit ($R_1$ is methyl) with an average particle size of 2 microns was heat-treated in a nitrogen atmosphere. The treated powder was mixed with 2% vinyltrimethoxysilane and 1% hexamethyldisilazane, the mixture was heated at 130° C. for 3 hours, and the powder was separated by cyclone to remove coarse oversize particles above 10 microns to obtain sample of Example 7. The analysis results of the samples were listed in Table 5.

The spherical siloxane of 100% T unit ($R_1$ is methyl) with an average particle size of 2 microns was heat-treated in a nitrogen atmosphere. The treated powder was mixed with 2% methyltrimethoxysilane and 1% hexamethyldisilazane, the mixture was heated at 130° C. for 3 hours, and the powder was separated by cyclone to remove coarse oversize particles above 10 microns to obtain sample of Example 8. The analysis results of the samples were listed in Table 5.

TABLE 5

| | Composition of Spherical Powder Filler | | Average Particle Size μm | Heat Treatment Temperature ° C. | Heat Treatment Time h | Atmosphere | 200-degree volatile moisture content % | Permittivity 500 MHz |
|---|---|---|---|---|---|---|---|---|
| | $T_3$ content % | $T_2$ content % | | | | | | |
| Example 7 | 99 | 1 | 2.0 | 550 | 20 | nitrogen | 0.04 | 2.6 |
| Example 8 | 99 | 1 | 2.0 | 550 | 20 | nitrogen | 0.05 | 2.7 |

Obviously, for each of samples obtained according to Examples 7-8, the permittivity was less than 3 and the 200-degree volatile moisture content was less than 0.1%, meeting the requirement of low permittivity (less signal delay) of the filler in the 5G era.

Embodiment 6

The spherical siloxane of 100% T unit ($R_1$ is methyl) with different average particle sizes was heat-treated at different temperatures for different times in a nitrogen atmosphere to obtain samples of Examples 9-13. The analysis results of the samples were listed in Table 6.

TABLE 6

| | Composition of Spherical Powder Filler | | Average Particle Size μm | Heat Treatment Temperature ° C. | Heat Treatment Time h | Atmosphere | 200-degree volatile moisture content % | Permittivity 500 MHz |
|---|---|---|---|---|---|---|---|---|
| | $T_3$ content % | $T_2$ content % | | | | | | |
| Example 9 | 99.7 | 0.3 | 0.5 | 550 | 20 | nitrogen | 0.06 | 2.8 |
| Example 10 | 99.7 | 0.3 | 2.0 | 550 | 20 | nitrogen | 0.04 | 2.6 |
| Example 11 | 99.7 | 0.3 | 10 | 550 | 20 | nitrogen | 0.04 | 2.6 |
| Example 12 | 99.9 | 0.1 | 30 | 550 | 20 | nitrogen | 0.03 | 2.6 |
| Example 13 | 99.99 | <0.1 | 50 | 550 | 20 | nitrogen | 0.02 | 2.6 |

Obviously, for each of samples obtained according to Examples 9-13, the permittivity was less than 3 and the 200-degree volatile moisture content was less than 0.1%, meeting the requirement of low permittivity (less signal delay) of the filler in the 5G era. In addition, a low-viscosity filler can be obtained by the tightly packed and graded powders of Examples 9-13.

Embodiment 7

Methyltrichlorosilane was added into water to provide a white precipitate. After being washed with deionized water, the precipitate was ground by a sand mill to a fine powder of 2 microns. After filtration and drying, the heat treatment was performed in a nitrogen atmosphere. The treated powder was mixed and treated with 4% hexamethyldisilazane, and then heated at 130° C. for 3 hours. The powder was separated by cyclone to remove coarse oversize particles above 10 microns to obtain the sample of Example 14. The analysis results of the sample were listed in Table 7.

TABLE 7

| | Composition of Spherical Powder Filler | | Average Particle Size μm | Heat Treatment Temperature ° C. | Heat Treatment Time h | Atmosphere | 200-degree volatile moisture content % | Permittivity 500 MHz |
|---|---|---|---|---|---|---|---|---|
| | $T_3$ content % | $T_2$ content % | | | | | | |
| Example 14 | 99 | 1 | 2.0 | 550 | 20 | nitrogen | 0.05 | 2.8 |

Obviously, for the sample obtained according to Example 14, the permittivity was less than 3 and the 200-degree volatile moisture content was less than 0.1%, meeting the requirement of low permittivity (less signal delay) of the filler in the 5G era.

It should be understood that samples of above Examples 1-14 can be vertex cut to remove coarse oversize particles. Specifically, coarse oversize particles above 1, 3, 5, 10, 20, 45, 55, or 75 m in the spherical or angular powder filler can be removed by dry or wet sieving or inertial classification according to the size of the semiconductor chip. Further, Uranium or thorium content of samples of above Examples 1-14 was less than 0.5 ppb, wherein the samples were dissolved in hydrofluoric acid and measured by ICP-MS.

The foregoing description refers to preferred embodiments of the present invention, and is not intended to limit the scope of the present invention. Various changes can be made to the foregoing embodiments of the present invention. That is to say, all simple and equivalent changes and modifications made in accordance with the claims of the present invention and the content of the description fall into the protection scope of the patent of the present invention. What is not described in detail in the present invention is conventional technical content.

What is claimed is:

1. A preparation method for a spherical or angular powder filler, comprising the steps of:
   S1, providing spherical or angular siloxane comprising a T unit, wherein the T unit=R1SiO3-, and R1 is a hydrogen atom or an organic group which can be independently selected from carbon atoms 1-18; and
   S2, performing heat treatment on the spherical or angular siloxane under an inert gas atmosphere or atmospheric atmosphere, the heat treatment temperature being between 250 degrees and 650 degrees, so that silicon hydroxyl groups in the spherical or angular siloxane are condensed to obtain the spherical or angular powder filler, wherein in the unit T of the spherical or angular powder filler, the content of the unit without containing a hydroxyl group in the total unit is greater than or equal to 95%, and the content of the unit containing one hydroxyl group in the total unit is less than or equal to 5%.

2. The preparation method according to claim 1, wherein the spherical or angular siloxane further comprises a Q unit, D unit and/or M unit, wherein Q unit=SiO4-, D unit=R2R3SiO2-, M unit=R4R5R6SiO2-, each of R2, R3, R4, R5, and R6 is a hydrogen atom or a hydrocarbyl which can be independently selected from carbon atoms 1-18.

3. The preparation method according to claim 1, wherein the spherical or angular siloxane further comprises silica particles.

4. The preparation method according to claim 1, wherein the preparation method further comprises treating the powder filler on surface by a treatment agent, wherein the treatment agent includes a silane coupling agent, which is (R7)a(R8)bSi(M)4-a-b, wherein each of R7, R8 is a hydrogen atom, a hydrocarbyl which can be independently selected from carbon atoms 1-18, or a hydrocarbyl which can be independently selected from carbon atoms 1-18 replaced by functional groups, wherein the functional group is at least one group selected from following organic functional groups: vinyl, allyl, styryl, epoxygroup, aliphatic amino, aromatic amino, methacryloxypropyl, acryloxypropyl, ureidopropyl, chloropropyl, mercaptopropyl, polysulfide group, isocyanate propyl, M is an alkoxy group comprising 1-18 carbon atoms or a halogen atom, a=0, 1, 2 or 3, b=0, 1, 2 or 3, and a+b=1, 2 or 3; and/or the treatment agent includes disilazane, which is (R9R10R11)SiNHSi(R12R13R14), wherein each of R9, R10, R11, R12, R13, R14 is a hydrogen atom or a hydrocarbyl which can be independently selected from carbon atoms 1-18.

5. The preparation method according to claim 1, wherein the preparation method comprises removing coarse oversize particles above 1, 3, 5, 10, 20, 45, 55 or 75 microns in the spherical or angular powder filler by dry or wet sieving or inertial classification.

6. The preparation method according to claim 1, wherein the spherical or angular powder filler has a particle size of 0.1-50 microns.

7. The preparation method according to claim 6, wherein the spherical or angular powder filler of different particle sizes is tightly packed and graded in resin to form a composite material.

8. The preparation method according to claim 7, wherein the composite material is suitable for semiconductor packaging materials, circuit boards and intermediate semi-finished products thereof, and semi-cured sheets or copper clad laminates of high-frequency high-speed circuit boards.

* * * * *